Jan. 7, 1969  M. J. DE GOOD  3,420,356

LOW PRESSURE ACCUMULATOR

Filed July 12, 1967  Sheet 1 of 2

INVENTOR.
MAYNARD J. DE GOOD
BY
ATTORNEYS

Jan. 7, 1969     M. J. DE GOOD     3,420,356
LOW PRESSURE ACCUMULATOR

Filed July 12, 1967     Sheet 2 of 2

INVENTOR.
MAYNARD J. DE GOOD
BY
ATTORNEYS

United States Patent Office 3,420,356
Patented Jan. 7, 1969

3,420,356
LOW PRESSURE ACCUMULATOR
Maynard J. De Good, Grand Rapids, Mich., assignor to Rapistan Incorporated, Grand Rapids, Mich., a corporation of Michigan
Filed July 12, 1967, Ser. No. 652,944
U.S. Cl. 198—127         9 Claims
Int. Cl. B65g *13/02*

ABSTRACT OF THE DISCLOSURE

This is an accumulator conveyor of the type in which the application and release of the propelling force is effected through changes in the vertical position of the propelling member effected by supporting it on rollers having a flattened portion. The particular feature of this invention is the provision of a driving connection between the transport roller and the supporting roller whereby the resistance of a stationary article on the transport roller acts as a brake to hold the supporting roller stationary with the propelling member disengaged from the transport roller.

Background of the invention

This invention relates to accumulator conveyors of the type operated by a continuously driven, endless propelling member which releases the articles automatically in response to one of the articles held stationary while it is resting on the transport rollers. It is an improvement over the type of accumulator conveyor disclosed in U.S. Patent 3,253,697 entitled Variable Pressure Conveyor, issued May 31, 1966. In this conveyor the propelling member is alternately raised and lowered as the eccentric supporting rollers rotate. This also occurs in this invention. In the prior art conveyor, when article movement ceases, a sensor actuated by the article causes the supporting rollers beneath the following article to become stationary with their flat areas upward. The supporting rollers are held in this position until the sensor is released.

This invention simplifies this structure by eliminating the sensor and the bar. While, unlike the prior art conveyor, it does not totally release the propelling force, it so reduces it that the total line pressure applied to the accumulated articles is substantially negligible. At the same time it retains the ability to be automatically self-starting, once the articles are free to resume movement.

Summary of invention

In this invention each eccentric propelling member supporting roller has a portion in driving contact with one of the transport rollers. This driving contact is sufficient to hold the support roller against rotation in response to the propelling member's movement when the propelling member is riding on the flattened or eccentric portion of the roller and the transport roller is held against rotation by a stationary article. The propelling force applied by the propelling member is greatly reduced at this point because it is sliding across the flat or cam surface of the supporting roller and also is disengaged from the transport roller. At the same time, the propelling member's movement is sufficient to reinitiate rotation of both the supporting roller and the transport roller once the article is released to reinitiate its forward movement.

Description of drawings

FIG. 5 is an enlarged oblique view of the cam or supporting roller for the propelling member;

The numeral 10 indicates a conveyor having a pair of side frame members 11 rigidly assembled in spaced relationship by cross pieces 12. Transport rollers 13 are mounted at spaced intervals between the frame members 11 and form a conveying or transport surface for articles.

Figure 1:
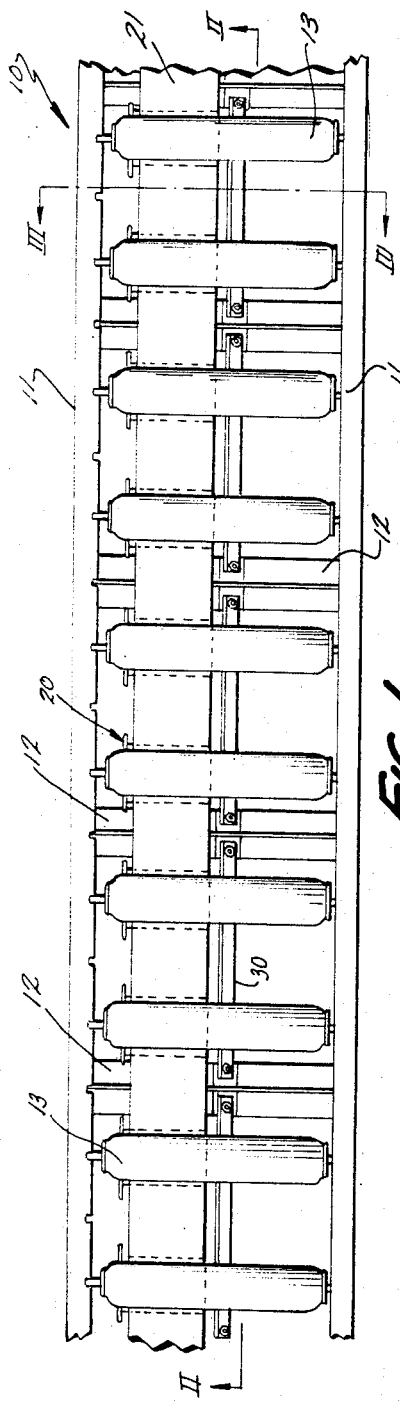
FIG. 1 is a fragmentary plan view of a conveyor equipped with this invention.
Figure 2:
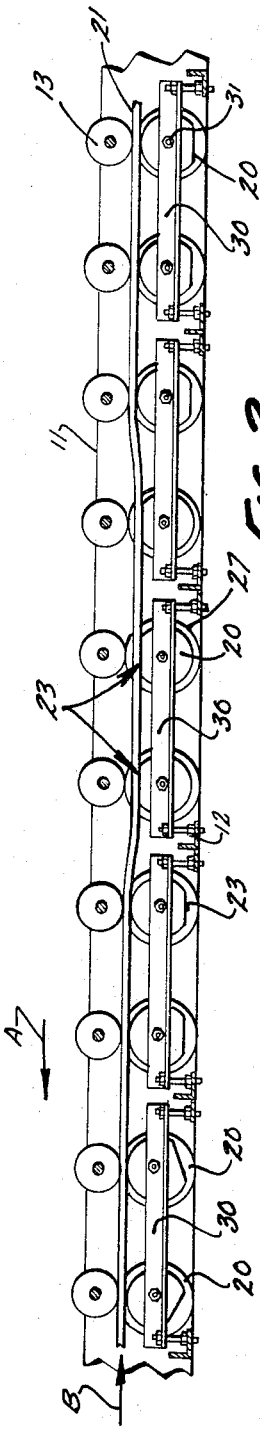
FIG. 2 is a sectional elevation view taken along the plane II—II of FIG. 1.

Beneath each of the transport rollers 13 is a cam or supporting roller 20. An endless, continuously driven propelling member 21, preferably a belt, is mounted between the supporting rollers 20 and the transport rollers 13 with the transport rollers normally holding the propelling member 21 in driving engagement with the transport rollers 13. When the articles are to be moved in the direction of the arrow A the propelling member will be driven in the direction of the arrow B (FIG. 2).

Figure 3:
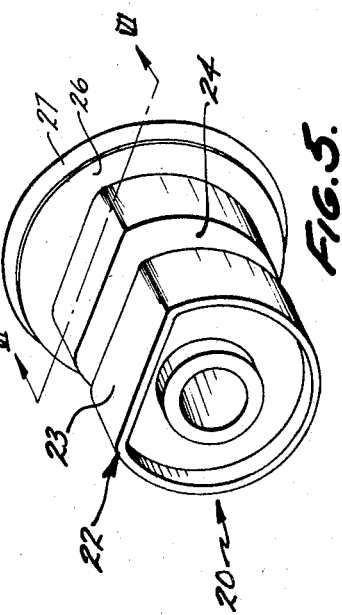
FIG. 3 is a sectional elevation view taken along the plane III—III of FIG. 1, showing the propelling member in driving position.
Figure 3:
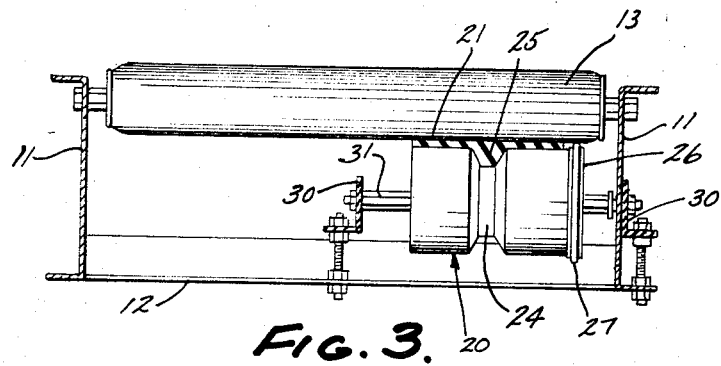
Figure 4:
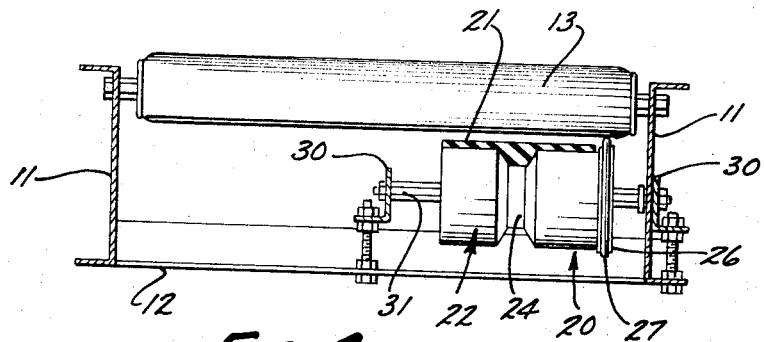
FIG. 4 is a view similar to FIG. 3, showing the propelling member in disengaged position.
Figure 6:
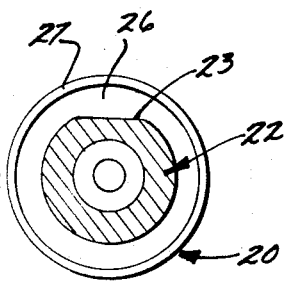
FIG. 6 is a sectional elevation view of the cam-wheel taken along the plane VI–VI of FIG. 5.

The propelling member rides on the cam portion 22 of each of the cam or supporting rollers 20 (FIG. 5). This portion is of uniform radius for a substantial portion of its circumference, but has a flat cam or rest area 23. When the propelling member is supported on the portion of uniform radius, it is held in driving engagement with the transport roller immediately above the support roller. When however, the propelling member is supported on the cam surface 23, the propelling member is lowered sufficiently to disengage the transport roller 13. The center of the cam portion has a slot 24 to receive the guide rib 25 of the propelling member 21 (FIGS. 3 and 4). This arrangement for effecting engagement and disengagement between the propelling member and the transport rollers is environmental to this invention. It is the subject of issued U.S. Patent 3,253,697.

At one end, each of the support rollers has a disc-like flange or wheel portion 26 of substantially greater diameter than the cam portion 22. This flange portion is relatively thin, and at its periphery has a channel in which is seated a band of material having a relatively high co-efficient of friction, preferably, an O-ring. The diameter of the periphery of the O-ring 27 is such that when the support roller is properly adjusted vertically with respect to the transport roller 13, the O-ring makes a light driving contact with the transport roller as is indicated in FIGS. 3 and 4.

In the preferred arrangement shown, the support rollers 20 are mounted in pairs on a sub-frame. The sub-frame consists of a pair of angles 30, extending lengthwise of the conveyor, one angle being secured to the lower flange of one of the side frame members 11 and the other angle to a pair of the cross braces 12 (FIGS. 3 and 4). The means used to secure these angles permits them to be vertically adjusted. The adjustable mounting of the sub-frame angles permits the support rollers 20 to be located at the precise height necessary to both cause driving contact between the O-ring or band 27 and the transport roller 13 and between the propelling member 21 and the transport roller 13, when the former is in raised position. The support rollers 20 are mounted for free rotation on shafts 31, extending between the angles 20.

Operation

After the conveyor has been assembled, the next step is to adjust the position of the supporting rollers 20 to permit the conveyor to function correctly. This is done by adjusting the vertical position of the frame members 30 so that the propelling member, when resting on the flat or cam surface 23 of the support rollers, is disengaged from the transport rollers 13 and when riding on the remaining portion of the support rollers it is in driving contact with the transport rollers. This adjustment is such that, preferably, a light driving contact between the band 27 and the transport rollers 13 is maintained at all times. However, it is possible to operate this conveyor with the band 27 in driving relation with the transport rollers 13 only when the propelling member is in its lowered position. This is possible in conveyors of this type since the ends of the shafts of the transport rollers are normally mounted in vertical slots, permitting a limited degree of vertical adjustment. In this case the transport roller will be raised slightly when the propelling member 21 is in driving engagement. This slight vertical shifting can be sufficient to either reduce or eliminate the driving contact between the band 27 and the transport roller 13.

During a substantial portion of each revolution of the supporting rollers 20, the propelling member is held in driving engagement with the transport rollers 13. For a minor portion of each revolution, the propelling member is dropped as the flat or cam surface 23 is turned upwardly. The first condition is illustrated in FIG. 3 and second in FIG. 4. Both conditions are illustrated in FIG. 2.

When the propelling member 21 is in the lowered position, the band 27 on the flange 26 through its contact with the transport roller 13 maintains a driving relationship between the support roller and the transport roller. Assuming an article is resting on the transport roller but moving freely along the conveyor without obstruction, the momentum of the article will drive the transport roller during the short interval that the propelling member rests on the cam 23 of the support roller and thus both will continue to turn. This rapidly returns the propelling member to driving relationship with the transport roller.

However, should the article become stationary, its resistance will restrict the freedom of the transport roller 13. If this occurs while the support roller is holding the propelling member in raised position, the transport roller will continue to rotate despite the resistance of the article until the flat or cam surface is presented to the propelling member and it disengages the transport roller. When this occurs, the transport roller will act as a brake upon the support roller 20. When the cam surface 23 is up, the drag or force of the propelling member is insufficient to overcome the braking effect of the article and thus the propelling member will slide across the cam surface of the support roller without rotating it. While it is true that the sliding engagement between the propelling member and the cam surface of the support roller will exert a small propelling force on the article, this force is minor and will not cause appreciable accumulation of line pressure even though a large number of articles become stationary on the conveyor.

As soon as the obstruction to the article's forward movement is eliminated, this force is sufficient to reinitiate slight forward movement of the article, permitting the support roller to turn and raise the propelling member into driving engagement with the transport roller once more. From this description it will be seen that this conveyor does not totally release all driving force from the articles but reduces it to a minute fraction of that normally applied to the articles. At the same time, the articles are automatically self-starting, once the obstruction to their forward movement is eliminated. This is important in making the conveyor fully automatic. The conveyor is considerably simplified over earlier accumulators in that it totally eliminates the necessity for sensing mechanisms and their related structure for raising and lowering the propelling member.

Figure 7:
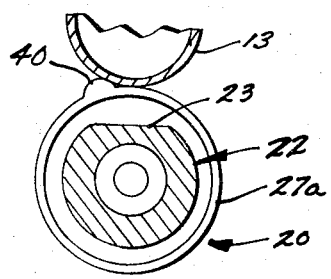
FIG. 7 is a view identical to FIG. 6 showing a modified form of the invention.

FIG. 7 illustrates a modification in which the band 27a has a slight protrusion or finger 40 acting as an arrest or stop. The stop finger 40 is so positioned that it contacts the transport roller just as the flat or cam surface 23 of the support roller reaches its maximum upward position. The height and shape of the stop finger 40 is such as to positively hold both the support and transport rollers stationary when the transport roller has a stationary article resting on it. The purposes of this stop finger is to assure positive arrest of the rotation of the support roller, even though the contact between the band 27a and the transport roller is so light that the drag of the propelling member could rotate the support roller even though this rotation is resisted by the braking action of the transport rollers. This arrangement reduces the criticality of the vertical adjustment of the support rollers. Furthermore, the stop finger acts as an indexing device positively locating the cam surface 23 in an upward position where the drag of the propelling member is minimal.

The arrangement illustrated in FIG. 7 can be applied in a different manner. In this further modification, the band 27a does not contact the transport roller; only the stop finger 40 effects a contact. In this case, the stop finger 40 acts as a positive indexing means to arrest the support roller with its cam surface 23 positioned upwardly. It will only arrest the rotation of the support roller when the transport roller is held stationary by an article since it will be carried through when both rollers are rotating simultaneously. In this arrangement, the stop finger serves the same purpose as the pin 33 and sliding bar 30 disclosed in U.S. Patent 3,253,697 entitled, Variable Pressure Conveyor, issued May 31, 1966.

This arrangement has the advantage of totally eliminating line pressure. At the same time, it has the disadvantage of not being self-starting. This requires the intervention of an operator or the use of starter or cleanout pads on the propelling member to reinitiate forward movement of the articles. These pads are conventional and are described in various patents such, for example, as the pad 50 in U.S. Patent 2,253,198 entitled Conveyor, issued Aug. 19, 1941.

In the preferred embodiments of this invention described above, a supporting roller 20 is provided beneath each transport roller 13. It is entirely possible, under appropriate operating circumstances, to utilize a lesser number of support rollers, for example, providing one for each alternate transport roller.

I claim:

1. An accumulator conveyor having a plurality of transport rollers forming an article transporting track, a continuously driven propelling member and a plurality of eccentric support rollers supporting said propelling member from beneath, alternately, during each rotation, in driving and non-driving relationship to said transport rollers, the improvement in said conveyor comprising: each of said support rollers having at least a portion thereof connected to one of said transport rollers when said propelling member is in non-driving relation to the same transport roller to transmit to said supporting roller the braking effect of an article forcibly held stationary on the transport roller, said braking effect holding the transport roller stationary.

2. The improvement in accumulator conveyors described in claim 1 wherein said portion is a protrusion extending radially from the support roller.

3. The improvement in accumulator conveyors described in claim 2 wherein said protrusion is of a compressible flexible material.

4. An accumulator conveyor having a plurality of transport rollers forming an article transporting track, a continuously driven propelling member and a plurality of eccentric support rollers supporting said propelling member from beneath, alternately, during each rotation, in driving and non-driving relationship to said transport rollers, the improvement in said conveyor comprising: each of said support rollers having a driving connection with one of said transport rollers when said propelling member is in non-driving relation to the same transport roller to transmit to said supporting roller the braking effect of an article forcibly held stationary on the transport roller to hold the transport roller stationary.

5. An accumulator conveyor having a plurality of transport rollers forming an article transporting track, a continuously driven propelling member and a plurality of rollers supporting said propelling member from beneath each of said supporting rollers having a flattened portion and being mounted for free rotation at a spacing beneath said transport rollers such that said propelling member is disengaged from the transport rollers when supported on said flattened portion and in driving engagement with said transport rollers when supported by the remaining portion of said supporting rollers, the improvement in said conveyor comprising: each of said supporting rollers having a portion of greater diameter than said roller, the periphery of said portion making driving contact with one of said transport rollers.

6. The improvement in accumulator conveyors described in claim 5 wherein said portion of said supporting rollers is a disc-like flange at one end thereof, the peripheral surface of said flange having a high co-efficient of friction.

7. The improvement in accumulator conveyors described in claim 6 wherein said peripheral surface is an O-ring.

8. The improvement in accumulator conveyors described in claim 6 wherein the periphery of said portion of said supporting rollers has a stop means thereon, said stop means being circumferentially located to contact the transport rollers when said flattened portion of the support roller is supporting the propelling member, said stop means exerting sufficient resistence to rotation to hold said supporting roller against rotation when rotation of said transport roller is resisted by a stationary article resting thereon.

9. The improvement in accumulator conveyors described in claim 8 wherein said stop means is a rounded protrusion.

References Cited

UNITED STATES PATENTS

| | | | |
|---|---|---|---|
| 2,253,198 | 8/1941 | Regan | 198—127 |
| 3,253,697 | 5/1966 | De Good et al. | 198—127 |
| 3,255,865 | 6/1966 | Sullivan | 198—127 |

EVON C. BLUNK, *Primary Examiner.*

R. J. HICKEY, *Assistant Examiner.*